March 26, 1957  D. PARRETT  2,786,561
SELF-ENERGIZING DISC CLUTCH
Filed April 6, 1954  5 Sheets-Sheet 1

INVENTOR.
Dent Parrett
BY Robert Cobb
Attorneys

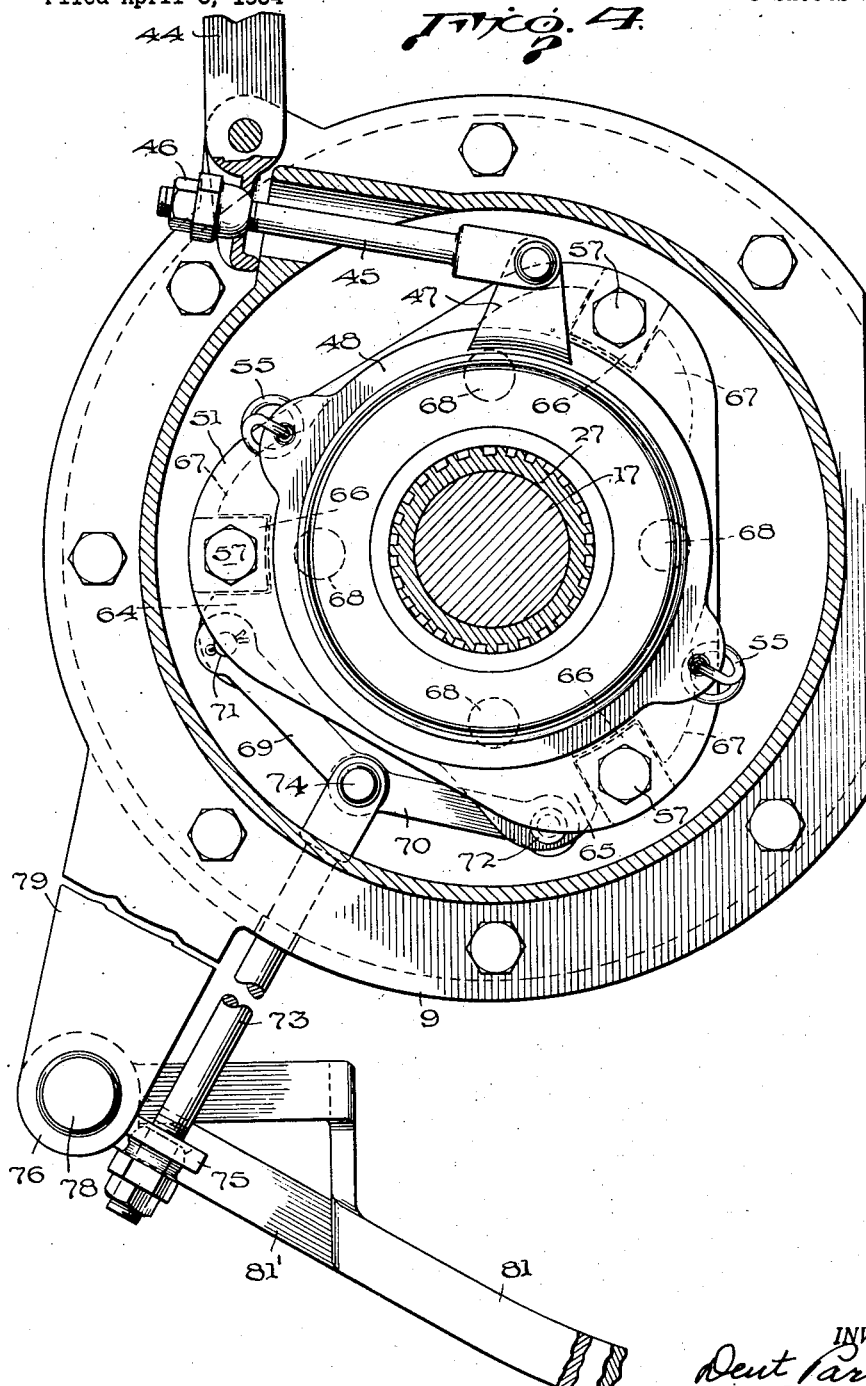

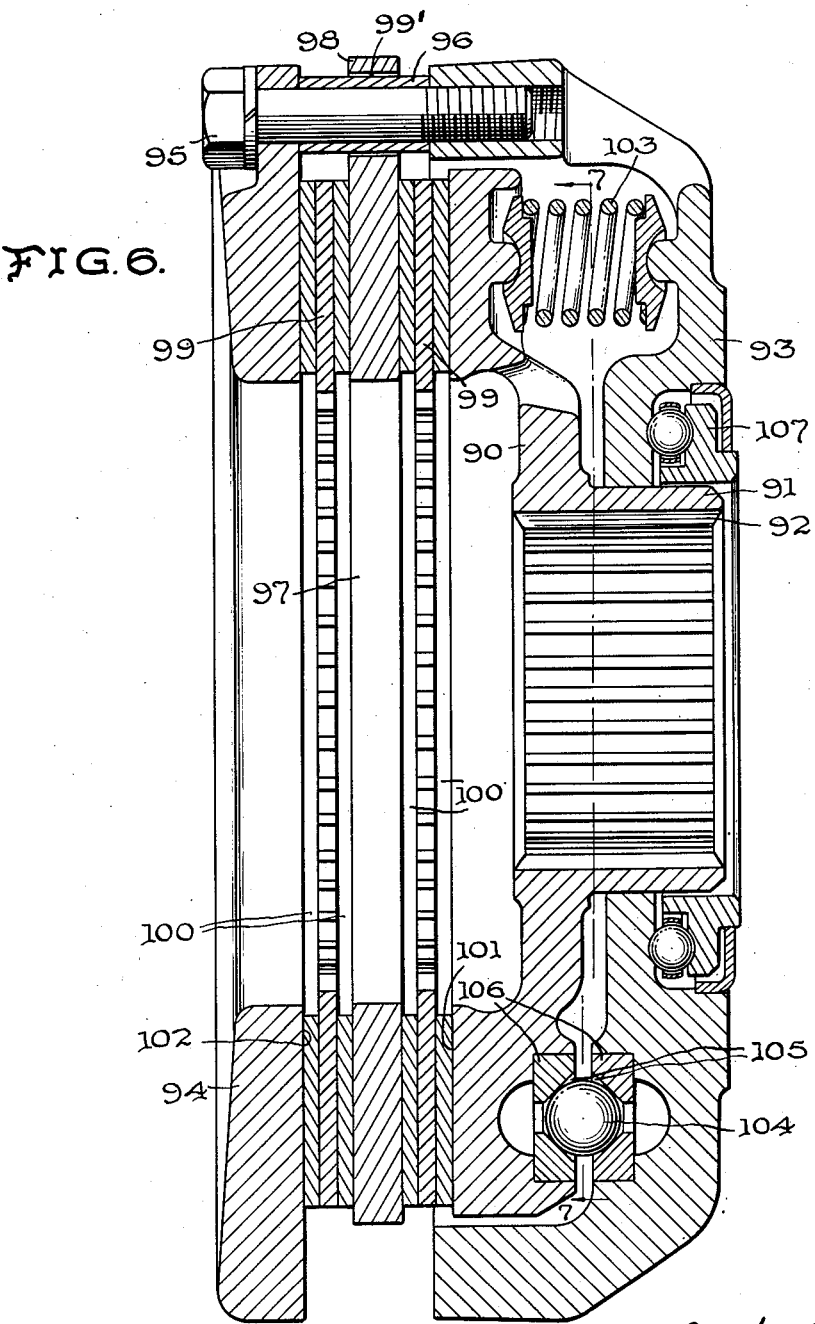

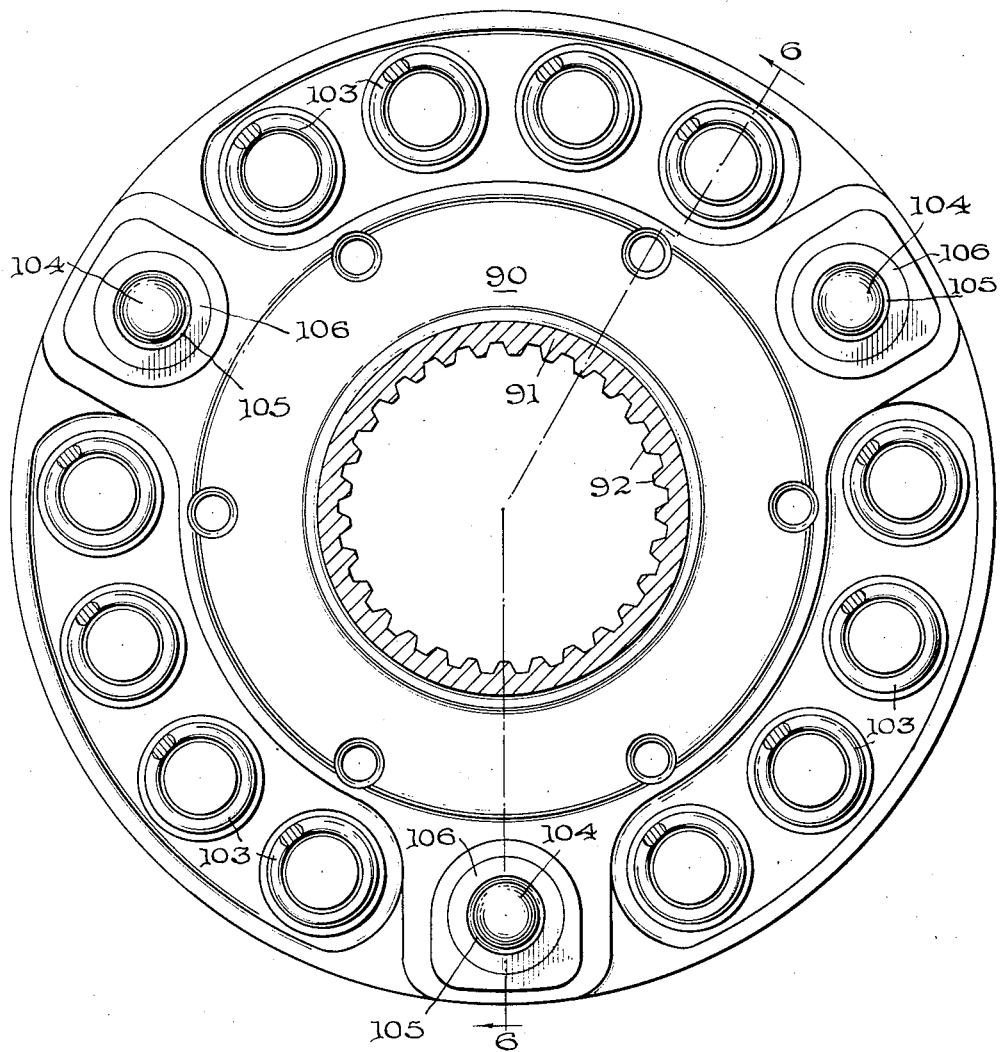

2,786,561
Patented Mar. 26, 1957

United States Patent Office

2,786,561

SELF-ENERGIZING DISC CLUTCH

Dent Parrett, St. Joseph, Mich., assignor, by mesne assignments, to Lambert Brake Corporation, St. Joseph, Mich., a corporation of Michigan Application April 6, 1954, Serial No. 421,230

4 Claims. (Cl. 192—69)

This application is a continuation-in-part of my copending application Serial No. 158,500, filed April 27, 1950, now Patent No. 2,679,769 issued June 1, 1954.

The present invention relates to self-energizing disc clutches, and more particularly to such clutches which are primarily adapted for use in the power-take-off control systems of farm tractors and other motive vehicles.

Certain makes of conventional and widely used farm tractors are adapted to tow auxiliary equipment such as hay balers, combines, and the like, and these tractors are in most instances equipped with a power-take-off mechanism for operating the auxiliary equipment as it is being towed. In at least certain makes of this type of farm tractor, the power transmission mechanism includes an auxiliary clutch which is interposed in the power transmission system behind the power-take-off drive, so as to be operative to interrupt the transmission of power to the traction wheels of the tractor, while allowing continuous, uninterrupted operation of the power-take-off drive. Thus, such auxiliary farm equipment as hay balers, combines, and the like may be operated without interruption, while the tractor which is towing the auxiliary equipment is capable of being set into motion or halted, at will, under the control of the auxiliary clutch. This results in certain marked advantages in the operation of the auxiliary equipment, since, when the auxiliary equipment begins to choke up due to overfeeding of material, forward motion of the equipment may be halted to allow the equipment to clear itself while the feed of additional material is interrupted.

Accordingly, a primary objective of this invention is to provide improved clutch means for installation in the power transmission system of farm tractors, but the clutch means is also adapted for use in any installation where it is desired to selectively transmit torque from one member to another or interrupt such torque transmission.

A further object is to provide a clutch mechanism which is particularly adapted for association with a countershaft and a coaxially mounted hollow shaft to effect rotation of said hollow shaft with said countershaft when the clutch is engaged, or to interrupt such rotation when the clutch is disengaged.

Another object is to provide such a clutch mechanism which is relatively small, yet exceptionally powerful, said clutch mechanism including a pair of relatively rotatable and relatively axially shiftable elements mounted one upon the other, one of said elements carrying a shiftable pressure plate which is disposed on the opposite side of the other element, and said element being adapted to be mounted on a rotatable member for rotation therewith, said clutch mechanism also including friction disc means adapted to be mounted on another rotatable member and disposed between said pressure plate and one of said elements, so as to be frictionally engaged between said pressure plate and the last-mentioned element to transmit rotation from one of said rotatable members to the other when engaged, or to allow relative rotation of said rotatable members when disengaged.

Still another object is to provide a clutch according to the next preceding paragraph which includes self-energizing cam means to positively shift the aforesaid relatively rotatable and axially shiftable elements axially away from one another responsive to load on the clutch.

Other objects and advantages will be hereinafter described or will become apparent to those skilled in the art, and the novel features of the present invention will be defined in the appended claims.

In the drawings:

Fig. 4 is an enlarged vertical sectional view taken on the lines 4—4 of Figs. 1 and 3;

Fig. 5 is a detail view on a reduced scale, showing the gear drive between the traction wheels and the differential assembly;

Fig. 6 is a view in transverse section of a slightly modified construction embodying the present invention, this view being taken on the line 6—6 of Fig. 7; and Fig. 7 is a vertical sectional view taken on the line 7—7 of Fig. 6.

Figure 1:
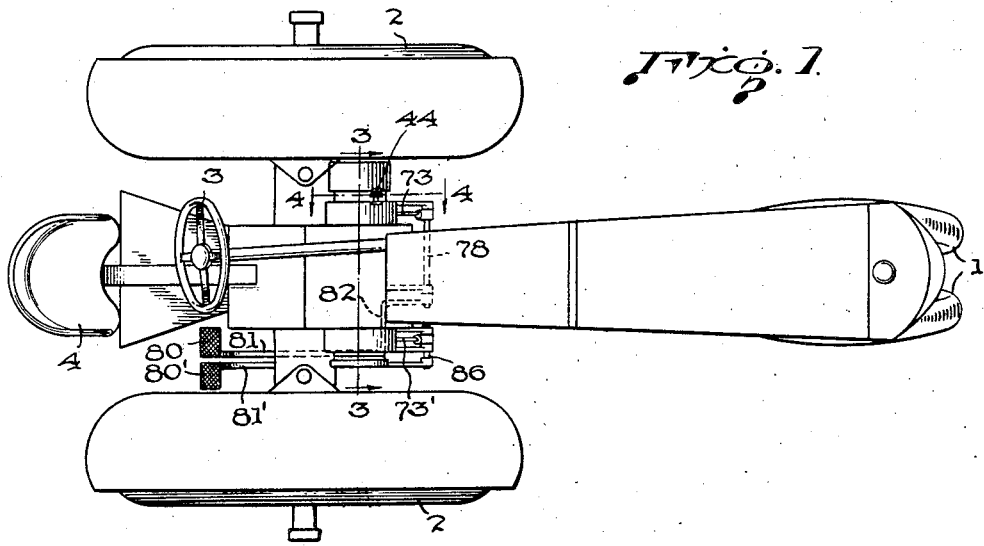
Fig. 1 is a view in top plan of a conventional farm tractor, showing my invention applied thereto.
Figure 2:
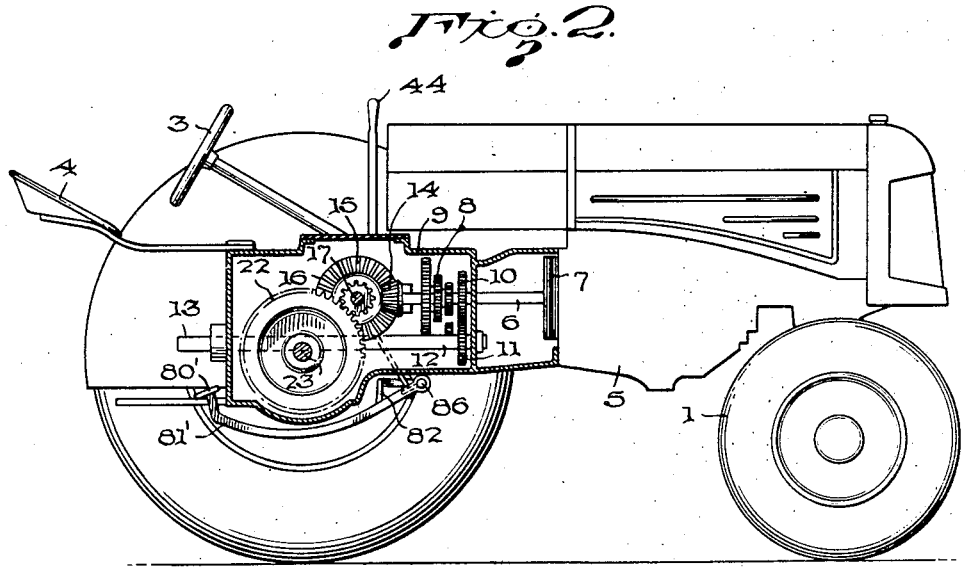
Fig. 2 is a view of the tractor in side elevation, with one of the traction wheels omitted, and other parts broken away and shown in section.

Like reference characters designate corresponding parts in the several figures of the drawing, wherein Figures 1 and 2 show a conventional farm tractor equipped with the usual steerable wheels 1 at the front end thereof, and provided at the rear with two large traction wheels or driving wheels designated 2. The front wheels 1 are adapted to be steered in the usual manner by means of the steering wheel 3 which is accessible from the operator's seat 4, and in addition, steering of the tractor may be aided by brakes acting upon the main traction or drive wheels 2 in a manner which will be hereinafter more fully explained.

The traction power for driving the tractor is derived from an engine generally indicated at 5, which is mounted near the forward end of the tractor, said engine being connected to a main drive shaft 6 which extends rearwardly from the rear end of the engine 5, said drive shaft 6 being controlled in the usual manner by a main clutch generally designated 7, which clutch is positioned near the rear end of the engine 5 and at the front of the drive shaft 6. This main clutch 7 is controlled by suitable control means (not shown) accessible to the operator when seated on the seat 4 of the tractor.

Connected to the main drive shaft 6 and driven thereby is the usual speed-change gear mechanism generally indicated at 8, which mechanism may be selectively controlled by suitable control means (not shown), usually having the form of a gear shift lever, to vary the speed ratio of the traction drive.

Just ahead of the speed-change gear mechanism which is located in the main transmission housing 9, the drive shaft 6 is provided with a gear 10 which is fixed to the shaft 6 for rotation therewith, said gear 10 meshing with the gear 11 on the forward end of a power-take-off shaft 12 which extends rearwardly to the back of the tractor and projects somewhat beyond the rear end thereof as indicated at 13, and constituting a power-take-off for transmitting power from the tractor engine 5 to other machinery which may be suitably connected to or drawn by the tractor in a well-known manner.

It will be understood from the foregoing that as long as the main clutch 7 is engaged, power will be transmitted from the engine 5 through the power-take-off mechanism in a continuous manner, although, if desired, the main clutch 7 may be temporarily disengaged to permit shifting of the change gear mechanism 8 to neutral, and then the clutch 7 can be reengaged to resume operation of the power-take-off. However, this practice necessitates at least a momentary or a temporary interruption of the power-take-off drive which is oftentimes undesirable in certain farming operations, particularly where this would result in resuming the power-take-off drive under a relatively heavy load.

Fixed to the rear end of the main drive shaft 6 and rotatable therewith in the transmission housing 9 is a bevelled pinion 14 which continuously meshes with a bevelled ring gear 15 of a conventional differential generally indicated at 16. This differential 16 is mounted on a countershaft 17 which extends transversely across the transmission housing 9 and from side-to-side thereof. Suitably mounted on the countershaft 17 at each side of the differential 16 are two pinions respectively designated 18 and 19. The pinion 18 meshes with a main drive gear 20 which is fixed on the inner end of a driven shaft 21, said shaft 21 being fixed at its outer end to one of the traction or drive wheels 2 of the tractor. The other pinion 19 similarly meshes with another main drive gear 22 which is fixed on the inner end of a separate driven shaft 23, and to the other end of the latter shaft is connected the other traction or drive wheel 2. It will be understood from the foregoing that the traction wheels 2, 2 are driven by the main drive shaft 6 through the differential 16, as will be best seen from reference to Figure 5 of the drawings.

In order to permit continuous and uninterrupted operation of the power-take-off hereinbefore referred to, while holding the tractor at a standstill, it is necessary to provide suitable control means permitting interruption of the traction drive, at will, and without disturbing the main clutch 7 which must remain engaged in order to continue operation of the power-take-off. The control means just referred to, including a self-energizing disc clutch embodying the present invention, will now be particularly described.

Figure 3:
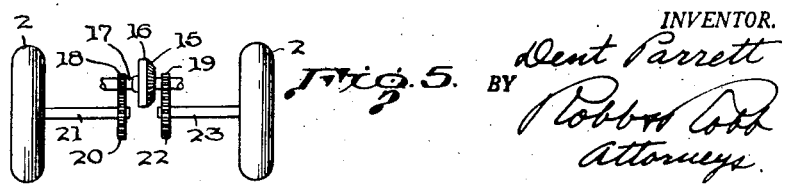
Fig. 3 is an enlarged transverse sectional view taken on the line 3—3 of Fig. 1, and showing more particularly the details of the clutch of the present invention.
Figure 3:
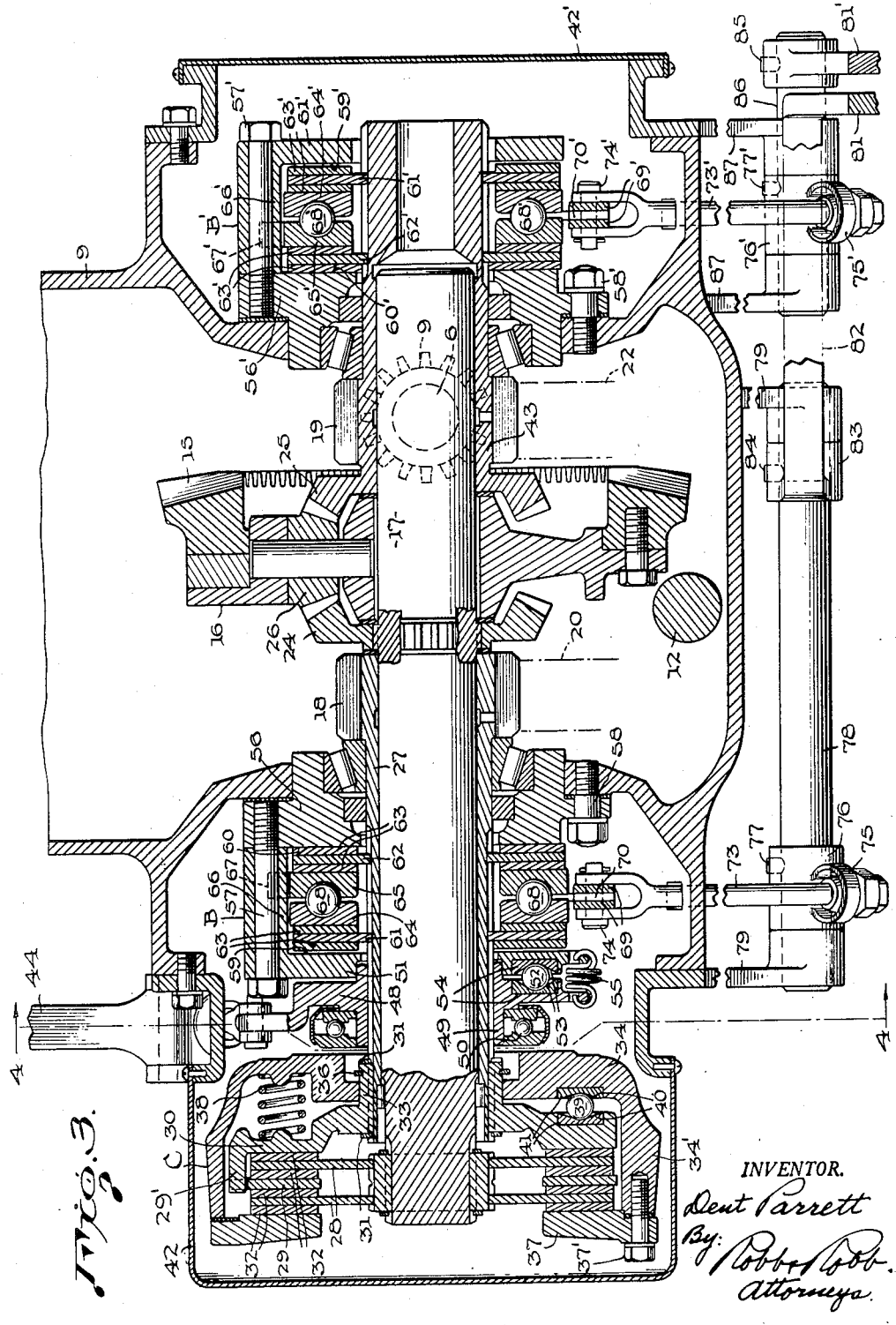

Referring to Figures 3 and 4 of the drawings, it will be seen that the differential 16 is supported on the countershaft 17 which extends coaxially through the differential, and that the differential assembly includes two bevelled gears designated 24 and 25 which mesh with an intermediate pinion 26 which is so supported by the frame of the differential as to be rotatable about an axis transverse to the central axis of the countershaft and ring gear 15. Bevelled gear 24 is preferably splined on the countershaft 17, as indicated in section in Figure 3.

It will be seen that the drive gear 18 is coaxial with the countershaft 17, but is carried by a hollow shaft 27 to which the gear 18 is suitably pinned, keyed or made as an integral forging, as preferred. This hollow shaft 27 is rotatively supported on the countershaft 17, and extends to the left, as viewed in Figure 3, somewhat beyond the left-hand side of the transmission housing 9, but terminates at its outboard end somewhat short of the outboard end of the countershaft 17 itself.

One form of clutch of the present invention as generally designated at C includes a plurality of friction discs or plates 28 which are adapted to be mounted on the extreme outboard end of the countershaft 17, as by means of a splined connection about their inner peripheries, so as to be rotatable with the countershaft 17, while being free to shift axially thereon. While only two friction discs 28 have been shown in the illustrations, it is to be understood that the number of friction discs may be varied, if desired, according to the load to which the clutch assembly is to normally be subjected.

Intermediate the clutch discs 28 is disposed an annular friction disc or ring 29 which is shiftably mounted for axial movements on a suitable number of axial projections or flanges 29' formed on the outer margin of a clutch power plate 30 for rotation with the plate 30, this plate in turn being keyed, splined, or otherwise suitably fixed to the outboard end of the hollow shaft 27, and held against axial displacement thereon as by means of snap rings 31, 31 located respectively on opposite sides of the axially extended hub 33 of the plate 30. Thus, the power plate 30 is fixed on the hollow shaft 27 for rotation therewith, and the intermediate disc 29 is supported by the flanges 29' on the plate 30 for rotation therewith, while being free to float axially between the friction discs 28, the latter discs being preferably provided with friction lining material 32 on the opposite faces thereof.

Slidably mounted on the axially extended hub 33 of the power plate 30 for rotation and for axial movements on the hub 33 is a primary actuating disc or plate 34 having a generally axially extended marginal flange 34' encircling the power plate 30, the friction discs 28 and the intermediate disc 29. The plate 34 constitutes a bell-like clutch housing, and a snap ring 36 engaging in a suitable annular groove in the outer margin of the hub 33 secures the plate 34 against inadvertent displacement from the hub 33 and limits movement of the plate 34 away from the power plate 30. Secured to the outboard end of the flange 34' on the primary plate 34 is a clutch pressure plate or secondary plate 37 in the form of an annular ring which is secured about its outer margin to the end of the flange 34', as by means of a suitable number of screw fasteners 37'. The secondary disc or pressure plate 37 is disposed in axially spaced, opposed relation to the outboard face of the power plate 30, and these two plates provide opposed, radially extended friction surfaces for engagement with the friction discs 28 when the pressure plate 37 is shifted axially towards the power plate 30.

For effecting such frictional engagement of the plates 29 and 30 with the friction discs 28, a suitable number of compression springs such as that designated 38 in Figure 3 are disposed intermediate the power plate 30 and the primary plate 34, and these springs 38 normally urge the primary plate 34 away from the power plate 30, whereby the pressure plate or secondary plate 37, through the intermediary of the flange 34' on plate 34, is shifted towards the pressure plate 30, to thereby shift the friction discs 28 into engagement with the opposite sides of the intermediate disc 29 and into frictional engagement with the opposed friction faces of the respective plates 30 and 37. Further means are provided for effecting such frictional engagement of the clutch elements by the provision of a suitable number of opposed inserts 41, 41 in the opposed walls of the plates 30 and 34, these inserts 41 having opposed conical depressions 40 therein, and a hardened ball 39 being disposed in each pair of opposed depressions 40, whereby relative rotative movements of the elements 30 and 34 will effect axial separation of the elements 30 and 34 by the camming action of the balls 39. Preferably, the clutch C includes a suitable number of springs 38 and balls 39 which are circumferentially and equi-distantly spaced about the clutch assembly in alternate relation.

Due to the fact that the power plate 30 is fixed to the hollow shaft 27 for rotation therewith, and the secondary plate or pressure plate 37 which is carried by the plate 34 is in frictional engagement with one of the friction discs 28 when the clutch is engaged, any tendency of the hollow shaft 27 to lag behind the countershaft 17, due to load on the hollow shaft 27 imparted thereto from the traction wheels 2, will effect immediate and powerful self-energization of the clutch, since the pressure plate 27 and the power plate 34 will rotate ahead of the power plate 30 along with the friction discs 28, thereby effecting a relative movement between the discs or plates 34 and 30 which will effect a camming action of the balls in the seats 40. As a result of this self-energization or servo-action, the clutch is torque responsive and the respective friction discs and plates are immediately pressed into more firm contact one with the other upon any tendency of the clutch to slip, regardless of the amount of load that may be imposed upon the clutch. Thus, the clutch C is extremely effective in permitting interruption of the transmission of power to the traction wheels of a tractor vehicle when towing heavy auxiliary farm equipment such as hay balers, combines, and the like, while allowing uninterrupted operation of the auxiliary equipment by the power-take-off mechanism of the tractor, and the clutch C has more than ample torque capacity to reestablish travel of the tractor and the towed auxiliary equipment without any slippage of the clutch as might normally occur under such a heavy load.

To protect the clutch, a removable cover 42 is attached to the outboard side of the transmission housing 9, said cover extending about the clutch assembly. However, the clutch is readily accessible for service and repair on removal of the cover 42, as will be obvious from the drawings.

When the clutch discs and plates are disengaged, no rotation of the countershaft 17 will be imparted to the hollow shaft 27, and consequently no power or rotation will be imparted to the traction wheel 2 which is normally driven by the pinion 18 through the drive gear 20. Under the same conditions, no power will be transmitted to the traction wheel 2 on the other side of the tractor due to the action of the differential gear mechanism, as will be readily understood by those skilled in the art. However, on engagement of the clutch C, both traction wheels 2 will be powered and driven in the conventional manner, it being understood that the wheel 2 on the right-hand side of the tractor, as viewed in Figs. 3 and 5, is driven by pinion 19 which is formed as a part of or otherwise suitably fixed to a tubular sleeve or extension 43 preferably formed as an integral part of the bevelled differential gear 25, said gear 25 and extension 43 being free to rotate on the countershaft 17, and being suitably journalled or supported in the right-hand side of the transmission housing 9, with the sleeve 43 extended somewhat beyond the outboard side of the transmission housing.

For controlling or operating the clutch to disengage the same, any suitable mechanism may be utilized, and for illsutrative purposes, there is depicted a control member 44, which is shown in the drawings as having the form of a hand-operated lever accessible to the operator when seated on the tractor seat 4, but which may be substituted by a foot-operated pedal, if preferred, said member 44 being pivotally mounted on the side of the transmission housing, as indicated in Figs. 3 and 4, and being connected to an adjustable link 45 having an adjusting nut 46 on one end thereof as shown in Fig. 4. The opposite end of the link 45 is pivotally connected to a radially off-set ear 47 which is extended generally upwardly from a plate 48 which is rotatively mounted upon the hollow shaft 27 and is free to shift rotatively relative thereto, responsive to pivotal or rocking motions of the operating member 44. The plate 48 is preferably provided with an axially extended hub or sleeve 49 on which is mounted a thrust bearing 50 which is preferably of the anti-friction type, as shown in Fig. 3, although it is to be understood that a plain thrust washer may be substituted for the anti-friction bearing 50, if preferred. The thrust bearing 50 is interposed between the plate 48 and plate or disc 34 of the clutch C. On the opposite side of the plate 48 is a fixed plate or disc 51 which forms a part of a brake assembly or brake unit generally designated B. Disposed between the plates 48 and 51 is a plurality of equi-distantly spaced balls or rollers 52 seating either in oppositely inclined seats or ramps 53 directly formed in the plates themselves, or provided in opposed inserts 54, 54, as shown in Fig. 3.

A plurality of coiled springs 55, arranged at equi-distantly spaced intervals about the central axis of the plates 48, 51, and interconnected at their opposite ends with the respective plates, serve to urge the plate 48 towards the plate 51, with the balls 52 seated in the deepest part of the inclined seats or ramps 53, this position of the plate 48 corresponding to the position assumed when the clutch C is engaged. However, upon shifting the actuating member 44 to cause relative rotation of the plate 48 in one direction or the other, about the central axis of the countershaft 17, the balls tend to axially shift the plate 48 away from the plate 51 pursuant to the action of the inclined ball seats, thereby forcing the thrust bearing 50 against the plate or disc 34 and axially shifting this plate, together with the disc or plate 37 attached thereto by bolts 37', to the left as viewed in Fig. 3, which in turn compresses the springs 38, and causes the clutch discs and plates to disengage so as to release the clutch.

Referring now to the brake assembly B with which the power-take-off control mechanism herein disclosed is preferably provided, and having particular reference to Figs. 3 and 4 of the drawings, it will be seen that the plate or disc 51 is fixed to another plate or disc 56 by means of a plurality of equi-distantly spaced bolts 57, and that said plate or disc 56 is in turn bolted or otherwise suitably anchored to the transmission housing 9, as by means of bolts 58. Thus, the two discs or plates 51 and 56 are rigidly held in a fixed or stationary position, with the discs or plates axially spaced apart for a substantial distance, and providing opposed annular braking or friction surfaces 59 and 60 on the opposed inner faces thereof.

Disposed between the discs or plates 51 and 56 are two friction discs 61 and 62, these friction discs being preferably provided with friction linings 63 on the opposite faces thereof. Both discs 61 and 62 are suitably splined on the hollow shaft 27 so as to be rotatable with the latter shaft, but free to move axially thereon towards and away from each other.

Also surrounding the hollow shaft 27 and disposed between the discs 61, 62, is a pair of actuator discs or plates respectively designated 64 and 65, said actuator discs or plates being piloted within a plurality of shoulders 66 formed integrally with the plate 51 and extended axially therefrom into abutting engagement with the plate or disc 56, with the connecting bolts 57 extended through the shoulders and threadedly secured to the plate 56.

Each of the discs or plate 64, 65 is provided with a plurality of equi-distantly spaced lugs or ears 67 radially extended therefrom and constituting stop lugs which coact with the respective shoulders 66 to limit relative rotative movements of the actuator discs 64, 65, while at the same time allowing axial movement of these actuator discs towards and away from each other.

Disposed intermediate the actuator discs 64, 65, and arranged in equi-distantly spaced relation to each other around the central axis thereof, is a plurality of balls 68, each of said balls seating in oppositely inclined seats or ramps formed in the opposed faces of the respective actuator discs 64, 65. Pivotally connected to the respective actuator discs is a pair of links respectively designated 69 and 70, the link 69 being connected by a pin 71 to one of the discs, and the link 70 being pivotally connected by a pin 72 to the other disc. The two links 69 and 70 are in turn pivotally connected together and to a draw link 73, as by means of a pin 74, said draw link 73 being adjustably connected to an arm 75 radially extended from a hollow hub or sleeve 76 fixed by a set screw 77 on a rock shaft 78 which in turn is journalled in brackets 79 mounted on the transmission housing 9.

The construction and operation of brake assembly B just described is generally similar to that shown and described in my prior Patent No. 2,387,039, granted October 16, 1945, and therefore, this brake structure need not be further described, since reference to the aforesaid patent may be made for purposes of obtaining a detailed explanation of the operation thereof.

Operation of the rock shaft 78 may be effected by any suitable operating instrumentalities, but is preferably controlled by a foot operated brake pedal 80 which is disposed so as to be conveniently accessible to the operator's foot when seated upon the seat 4 of the tractor. The pedal 80 is carried by an arm 81 having a transversely off-set extension 82 connected at its free end to a sleeve or collar 83 which is anchored by a set screw 84 or in any other suitable manner to the rock shaft 78.

An identical or generally similar brake assembly designated B' is provided at the right-hand side of the transmission housing 9 as viewed in Fig. 3; this brake assembly serving to permit braking applications to be made on the right-hand wheel of the tractor. Since the parts of the brake assembly B' are identical or similar to those of the brake assembly B, this brake B" need not be further described, and the parts thereof are identified by the same reference characters with the addition of a prime marking. It should be noted, however, that the foot pedal 80' is carried by an arm 81' which is fixed by a set screw 85 or otherwise anchored in any other suitable manner to a separate rock shaft 86 which is journalled in brackets 87 extended from the transmission housing 9.

It is to be understood that the arrangement of the differential 16, the brake B, and the brake B' in association with the transmission mechanism of a tractor, is the subject matter of the aforementioned application of which this application is a continuation-in-part, and the present invention is primarily directed to the clutch C, per se, the power transmission mechanism with which the clutch B is associated being shown merely for illustrative purposes.

In Figs. 6 and 7, there is shown a slightly modified form of clutch which is adapted to be associated with the outboard ends of the countershaft 17 and the hollow shaft 27 in the same manner as the aforementioned clutch C. This modified clutch includes a power plate 90 having a central, axially extending hub 91 formed with interior splines 92, whereby the plate 90 is adapted to be mounted for rotation on a complementary splined rotatable member, such as the hollow shaft 27 previously described. Slidably mounted upon the hub 91 of the power plate 90 is a clutch housing member in the form of a primary clutch-actuating plate or disc 93 having its outer marginal portion directed generally axially and encompassing the outer margin of the power plate 90.

Supported on the plate 93 is a secondary actuating disc or clutch pressure plate 94 of annular form, this pressure plate 94 being secured to the primary plate 93 by means of a suitable number of screws 95, and being maintained in spaced relation to the plate 93 by means of a spacer sleeve 96 disposed about each screw 95 intermediate the plates 93 and 94. Thus, the clutch pressure plate 94 is carried by the primary plate 93 which is supported on the power plate 90 at the side thereof opposite the pressure plate 94, whereby movement of the primary plate 93 towards and away from the power plate 90 will effect a corresponding movement of the pressure plate 94 away from and towards the power plate 90, respectively.

Disposed between the power plate 90 and the pressure plate 94 is an intermediate clutch plate 97 which is supported upon the sleeves 96 by means of an ear 98 projecting radially from the intermediate disc 97 and having an opening 99' therethrough, the plate 97 being provided with an ear 98 for supporting engagement on each of the sleeves 96 on the respective screws 95, and it being understood that any suitable number of screws and sleeves 95, 96 may be provided in the clutch assembly. The intermediate plate 97 is, accordingly, carried by the primary plate 93 and the pressure plate 94, but is free to float axially upon the sleeves 96.

Interposed between the intermediate plate 97 and the power plate 90 and the pressure plate 94, respectively, is a pair of annular friction discs 99, each having a splined inner periphery adapted to be mounted on a complementary splined rotatable member such as the countershaft 17 of the hereinbefore described mechanism. On the opposite side faces of the discs 99, they are preferably provided with suitable friction lining material 100 for frictional engagement with the intermediate disc 97 and the power plate 90 and the pressure plate 94, respectively, the power plate 90 providing a friction surface 101 in opposed spaced relation to the intermediate disc 97, and the pressure plate 94 also providing a friction surface 102 disposed in opposed spaced relation to the intermediate plate 97.

For purposes of shifting the primary actuating plate 93 axially away from the power plate 90, with attendant shifting of the pressure plate 94 towards the power plate 90, a plurality of coiled compression spring assemblies 103 are interposed between the power plate and the primary actuating plate. These spring assemblies 103 constitute clutch-engaging springs, and, as is best seen in Fig. 7, there are preferably twelve of these spring assemblies 103 disposed in equi-distantly spaced circumferentially arranged groups of four each. Intermediate each group of four clutch-engaging spring assemblies 103, there is disposed a clutch-energizing hardened ball 104, each ball 104 being mounted in a pair of opposed conical depressions 105 formed in a pair of inserts 106 which are mounted in suitable sockets in the opposed faces of the power plate 90 and the primary plate 93, respectively. Accordingly, the clutch is normally engaged by the springs 103, but when load on the clutch is such that the power plate 90 tends to lag behind the friction discs 99, the primary actuating disc 93 will be caused to rotate slightly upon the hub 91 of the power plate 90, by virtue of the frictional engagement of the friction discs 99 with the pressure plate 94 and the intermediate plate 97 which are both carried by the primary actuating plate 93. Upon such rotation of the primary plate 93 on the hub 91 relative to the power plate 90, the balls 104 will effect a camming action as they are caused to ride up out of the opposed depressions 105, thus positively forcing the primary plate 93 away from the power plate 90 and thereby effecting powerful self-energization of the clutch responsive to the load on the clutch.

For disengaging the clutch, the primary actuating plate 93 is provided with a suitable throw-out bearing assembly 107 seated in an annular depression about the inner periphery of the primary plate 93 and adapted to be engaged by any suitable operating member adapted to exert axial pressure upon the throw-out bearing 107. Such axial pressure on the throw-out bearing 107 will force the balls back down into their seats, and compress the springs 103, thereby shifting the primary plate 93 and the pressure plate 94 axially with respect to the power plate 90 in a direction whereby the pressure plate 94 moves away from the power plate 90, thus releasing the frictional engagement of the friction discs 99 with the plates 90, 94, and 97.

It should be noted that both the clutch C first described, and the clutch of Figs. 6 and 7 are extremely simple in their construction and are therefore very easy to manufacture, assemble, and install, but these clutches, nevertheless, have an extremely high torque capacity and are very durable and serviceable for long periods of time without repair.

It should be understood that while only one intermediate disc or plate 29 and 97 has been shown in the respective clutches of this application, and only one pair of friction discs 28 and 99 has been shown therein, additional intermediate plates may be employed, if desired, and for each additional intermediate plate, an additional friction disc would be employed, so that each intermediate plate is disposed between a pair of friction discs.

In addition, if desired, only a single friction disc 28 or 99 may be employed and no intermediate plate will then be necessary.

Accordingly, the term "friction disc means" in the following claims should be understood to embrace one or more friction discs 28 or 99, with or without an intermediate plate, as the case may be.

While the specific details have been herein shown and described, changes and alterations may be resorted to without departing from the spirit of this invention as defined in the appended claims.

I claim:

1. A friction device of the class described, comprising a pair of rotatable members, one of said members being in the form of an open-ended hollow shaft, the other of said members being in the form of a countershaft extending through said hollow shaft and having one end projecting from an open end of the hollow shaft, a power plate fixedly mounted at the end of one of said shafts for rotation therewith, an actuator plate mounted on said power plate for movements relative to said power plate, a pressure plate disposed in spaced relation to said power plate, means supporting said pressure plate on said actuator plate, friction disc means disposed between said pressure and power plates and shiftably mounted at the end of the other of said shafts for rotation therewith, and means between said power and actuator plates for shifting said actuator plate away from said power plate to press said friction disc means between said pressure and power plates.

2. A friction device as defined in claim 1, wherein said friction disc means includes a pair of friction discs and an intermediate plate between said friction discs, said power plate having an axially extended marginal flange overlying one friction disc of said pair, and said intermediate plate being connected with said marginal flange.

3. A friction clutch of the class described, comprising a pair of relatively axially shiftable plates disposed in side-by-side spaced relation, one of said plates having a central axially extended hollow hub, a rotatable member, said rotatable member extending through said hub and the hub being mounted on said rotatable member for rotation therewith, the other of said plates being supported on the axially extended portion of said hub, a pressure plate carried by one of said pair of plates and disposed in opposed spaced relation to the other of said pair of plates, friction disc means including a friction disc interposed between the last-mentioned plate and said pressure plate, a rotatable member on which said friction disc is mounted, means shiftably connecting said friction disc to said rotatable member on which it is mounted for rotation therewith, and clutch-engaging means interposed between said pair of plates for shifting said pair of plates relatively axially apart to effect engagement of said friction disc means between said pressure plate and the adjacent plate of said pair.

4. A friction device as defined in claim 1, wherein said pressure plate is secured to the actuator plate by a plurality of fastener screws, said screws having spacer sleeves thereon disposed between said pressure and actuator plates, and said friction disc means includes a pair of friction discs and an intermediate disc between said pair of friction discs, said intermediate disc being provided with a plurality of marginal projections supportingly engaged with said sleeves.

References Cited in the file of this patent
UNITED STATES PATENTS

| | | |
|---|---|---|
| 987,954 | Brush | Mar. 28, 1911 |
| 2,446,138 | Lambert | July 27, 1948 |